United States Patent
Weber et al.

(10) Patent No.: US 7,387,670 B2
(45) Date of Patent: Jun. 17, 2008

(54) PIGMENT PREPARATIONS BASED ON PHTHALOCYANINE PIGMENTS

(75) Inventors: Joachim Weber, Reinach (CH); Manfred Opravil, Karben (DE); Magali Meder, Kelkheim (DE); Hans-Tobias Macholdt, Darmstadt-Eberstadt (DE)

(73) Assignee: Clariant Produkte (Deutschland) GmbH, Frankfurt (DE)

( * ) Notice: Subject to any disclaimer, the term of this patent is extended or adjusted under 35 U.S.C. 154(b) by 9 days.

(21) Appl. No.: 10/591,578

(22) PCT Filed: Feb. 22, 2005

(86) PCT No.: PCT/EP2005/001800

§ 371 (c)(1),
(2), (4) Date: Nov. 29, 2006

(87) PCT Pub. No.: WO2005/085366

PCT Pub. Date: Sep. 15, 2005

(65) Prior Publication Data

US 2007/0186815 A1    Aug. 16, 2007

(30) Foreign Application Priority Data

Mar. 3, 2004    (DE) .................... 10 2004 010 284

(51) Int. Cl.
- *C09B 67/22* (2006.01)
- *C09B 67/20* (2006.01)
- *C09D 11/00* (2006.01)
- *C09D 11/02* (2006.01)

(52) U.S. Cl. ............... 106/413; 106/31.77; 106/31.78; 106/410; 106/411; 106/412; 47/57.6; 353/84; 430/7; 430/108.2; 430/108.3; 524/88

(58) Field of Classification Search ......... 106/31.77, 106/37.78, 410, 411, 412, 413; 47/57.6; 353/84; 430/7, 108.2, 108.3; 524/88
See application file for complete search history.

(56) References Cited

U.S. PATENT DOCUMENTS

| | | | |
|---|---|---|---|
| 4,986,852 A | 1/1991 | Dietz et al. | |
| 5,420,187 A | 5/1995 | Endo et al. | |
| 5,556,456 A | 9/1996 | Inoue et al. | |
| 2006/0112856 A1 | 6/2006 | Brychey et al. | |
| 2006/0137573 A1 | 6/2006 | Brychey et al. | |
| 2007/0068420 A1 * | 3/2007 | Ohleier et al. | ........... 106/31.78 |
| 2007/0186815 A1 * | 8/2007 | Weber | ........... 106/410 |

FOREIGN PATENT DOCUMENTS

| | | |
|---|---|---|
| EP | 0231919 | 6/1989 |
| EP | 0659842 | 12/1994 |
| EP | 1130065 | 9/2001 |
| GB | 2275477 | 8/1994 |
| JP | 09137075 | 5/1997 |
| WO | WO 2004/004563 | 1/2002 |
| WO | WO 2004/052996 | 6/2004 |
| WO | WO 2004/052997 | 6/2004 |

OTHER PUBLICATIONS

PCT International Search Report for PCT/EP2005/001800, mailed Jun. 14, 2005.
English Translation of PCT International preliminary Report on Patentability for PCT/EP2005/001800, mailed Nov. 9, 2006.

* cited by examiner

*Primary Examiner*—Anthony J. Green
(74) *Attorney, Agent, or Firm*—Anthony A. Bisulca

(57) ABSTRACT

A pigment preparation comprising at least one copper phthalocyanine pigment from the group of C.I. Pigment Blue 15, 15:0, 15:1, 15:2, 15:3, 15:4, and 15:6, and at least one pigment dispersant of the formula (I),

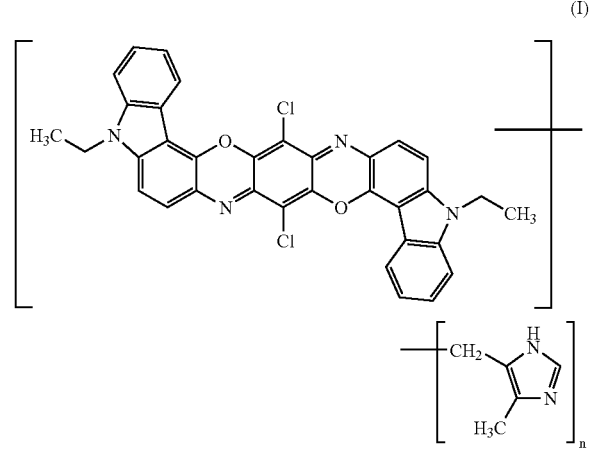

in which n is a number 1, 2, 3 or 4.

10 Claims, No Drawings

PIGMENT PREPARATIONS BASED ON PHTHALOCYANINE PIGMENTS

The present invention relates to new pigment preparations comprising phthalocyanine pigment as base pigment and comprising pigment dispersant derived from C.I. Pigment Violet 23.

Pigment preparations are combinations of base pigments and what are called pigment dispersants, which are pigments substituted by groups having a specific activity. The pigment dispersants are added to the pigments in order to facilitate their dispersion in the application media, in particular in paints and printing inks, and to enhance the rheological and coloristic properties of the pigments. The viscosity of the highly pigmented paint and printing-ink concentrates (millbases) is lowered and the flocculation of the pigment particles is lessened. As a result it is possible to increase, for example, the color strength, the transparency, and the gloss. This is desirable particularly for metallic paints.

WO 02/04563 discloses dispersions comprising a mixture of a solid solution of a host pigment and a guest pigment with a rheology improver.

EP-A-1 130 065 discloses similar mixtures which are composed of a copper phthalocyanine and a second organic pigment and which where appropriate may comprise a copper phthalocyanine derivative.

The known pigments and pigment preparations do not always meet all of the requirements of the industry. For blue pigments in particular there has been a need for improvement with regard to color strength, transparency, rheology, and gloss.

It has been found that this object is achieved, surprisingly, by a pigment preparation comprising a phthalocyanine base pigment and a specific pigment dispersant.

The invention provides pigment preparations comprising at least one, preferably 1 or 2, copper phthalocyanine pigment(s) from the group of C.I. Pigment Blue 15, 15:0, 15:1, 15:2, 15:3, 15:4, and 15:6, and also at least one, preferably 1, 2 or 3, pigment dispersant(s) of the formula (I), The pigment dispersants of the formula (I) are known compounds and can be prepared by known processes, as for example in accordance with EP-A-321 919.

Besides the copper phthalocyanine pigment and the pigment dispersant, the pigment preparations of the invention may comprise further, customary auxiliaries or additives, such as, for example, surfactants, nonpigmentary and pigmentary dispersants, fillers, standardizers, resins, waxes, defoamers, antidust agents, extenders, antistatics, shading colorants, P.V. 23 for example, preservatives, drying retardants, rheology control additives, wetting agents, antioxidants, UV absorbers, and light stabilizers, preferably in an amount of 0.1% to 25% by weight, in particular 0.5% to 15% by weight, based on the total weight of the pigment preparation. It is also possible to synthesize and use the pigment dispersant in the form of a mixture of unsubstituted, monosubstituted, and disubstituted P.V. 23.

Suitable surfactants include anionic, or anion-active, cationic, or cation-active, and nonionic or amphoteric substances, or mixtures of these agents.

Examples of suitable anionic substances include fatty acid taurides, fatty acid N-methyltaurides, fatty acid isethionates, alkylphenylsulfonates, an example being dodecylbenzenesulfonic acid, alkylnaphthalenesulfonates, alkylphenol polyglycol ether sulfates, fatty alcohol polyglycol ether sulfates, fatty acid amide polyglycol ether sulfates, alkylsulfosuccinamates, alkenylsuccinic monoesters, fatty alcohol polyglycol ether sulfosuccinates, alkanesulfonates, fatty acid glutamates, alkylsulfosuccinates, fatty acid sarcosides; fatty acids, examples being palmitic, stearic and oleic acid; the salts of these anionic substances and soaps, examples being alkali metal salts of fatty acids, naphthenic acids and resin acids, abietic acid for example, alkali-soluble resins, rosin-modified maleate resins for example, and condensation products based on cyanuric chloride, taurine, N,N'-diethylaminopropylamine and p-phenylenediamine. Preference is given to resin soaps, i.e., alkali metal salts of resin acids.

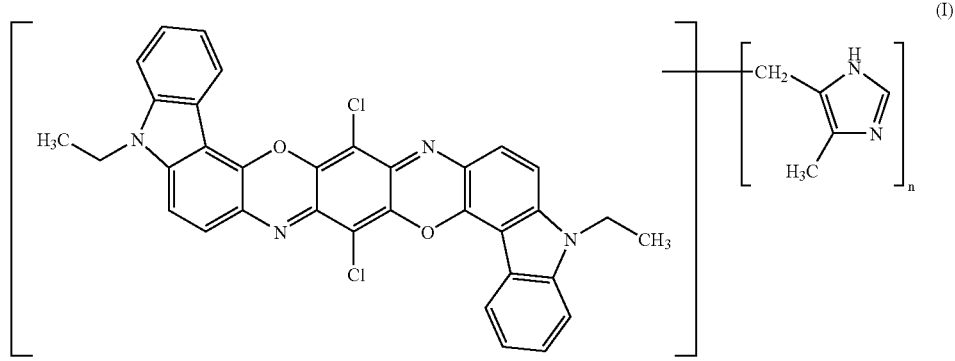

in which n is a number 1, 2, 3 or 4, preferably 1 or 2, the weight ratio of copper phthalocyanine pigment to pigment dispersant of the formula (I) being preferably between (99.9 to 0.1) and (75 to 25), more preferably between (99 to 1) and (80 to 20), in particular between (98 to 2) and (85 to 15), and with very particular preference between (97 to 2.5) and (90 to 10).

Examples of suitable cationic substances include quaternary ammonium salts, fatty amine oxalkylates, polyoxyalkyleneamines, oxalkylated polyamines, fatty amine polyglycol ethers, primary, secondary or tertiary amines, examples being alkylamines, cycloalkylamines or cyclized alkylamines, especially fatty amines, diamines and polyamines derived from fatty amines or fatty alcohols, and the oxalkylates of said amines, imidazolines derived from fatty acids, polyaminoamido or polyamino compounds or resins having an amine index of between 100 and 800 mg of KOH per g of the polyaminoamido or polyamino compound, and salts of these cationic substances, such as acetates or chlorides, for example.

Examples of suitable nonionic and amphoteric substances include fatty amine carboxyglycinates, amine oxides, fatty alcohol polyglycol ethers, fatty acid polyglycol esters, betaines, such as fatty acid amide N-propyl betaines, phosphoric esters of aliphatic and aromatic alcohols, fatty alcohols or fatty alcohol polyglycol ethers, fatty acid amide ethoxylates, fatty alcohol-alkylene oxide adducts and alkylphenyl polyglycol ethers.

By nonpigmentary dispersants are meant substances which structurally are not derived from organic pigments. They are added as dispersants either during the actual preparation of pigments, but often, also, during the incorporation of the pigments into the application media that are to be colored: for example, during the preparation of varnishes or printing inks, by dispersing the pigments into the corresponding binders. They may be polymeric substances, examples being polyolefins, polyesters, polyethers, polyamides, polyimines, polyacrylates, polyisocyanates, block copolymers thereof, copolymers of the corresponding monomers, or polymers of one class modified with a few monomers from a different class. These polymeric substances carry polar anchor groups such as, for example, hydroxyl, amino, imino and ammonium groups, carboxylic acid and carboxylate groups, sulfonic acid and sulfonate groups or phosphonic acid and phosphonate groups, and may also have been modified with aromatic, nonpigmentary substances. Nonpigmentary dispersants may additionally also be aromatic substances modified chemically with functional groups and not derived from organic pigments. Nonpigmentary dispersants of this kind are known to the skilled worker and in some cases are available commercially (e.g., Solsperse®, Avecia; Disperbyk®, Byk-Chemie; Efka®, Efka). A number of types will be named below, by way of representation, although in principle any desired other substances described can be employed, examples being condensation products of isocyanates and alcohols, diols or polyols, amino alcohols or diamines or polyamines, polymers of hydroxycarboxylic acids, copolymers of olefin monomers or vinyl monomers and ethylenically unsaturated carboxylic acids and carboxylic esters, urethane-containing polymers of ethylenically unsaturated monomers, urethane-modified polyesters, condensation products based on cyanuric halides, polymers containing nitroxyl compounds, polyester amides, modified polyamides, modified acrylic polymers, dispersants with a comblike structure comprising polyesters and acrylic polymers, phosphoric esters, triazine-derived polymers, modified polyethers, or dispersants derived from aromatic, nonpigmentary substances. These parent structures are in many cases modified further, by means for example of chemical reaction with further substances carrying functional groups, or by means of salt formation.

By pigmentary dispersants are meant pigment dispersants which derive from an organic pigment parent structure and are prepared by chemically modifying said parent structure, examples being saccharine-containing pigment dispersants, piperidyl-containing pigment dispersants, naphthalene- or perylene-derived pigment dispersants, pigment dispersants having functional groups which are attached to the pigment parent structure via a methylene group, pigment parent structures chemically modified with polymers, pigment dispersants containing sulfo acid, sulfonamide or sulfo acid ester groups, pigment dispersants containing ether or thioether groups, or pigment dispersants containing carboxylic acid, carboxylic ester or carboxamide groups.

Anionic groups of the nonpigmentary and pigmentary dispersants, surfactants or resins used as auxiliaries may also be laked, using for example Ca, Mg, Ba, Sr, Mn or Al ions or using quaternary ammonium ions.

By fillers and/or extenders are meant a multiplicity of substances in accordance with DIN 55943 and DIN EN 971-1, examples being the various types of talc, kaolin, mica, dolomite, lime, barium sulfate or titanium dioxide. In this context it has proven particularly appropriate to make the addition before the pulverization of the dried pigment preparation.

The pigment preparation of the invention can be employed as a preferably aqueous presscake or as moist granules, but generally comprises solid systems of free-flowing, pulverulent nature, or granules.

The invention also provides a process for preparing a pigment preparation of the invention, which comprises mixing the pigment dispersant of the formula (I) and the copper phthalocyanine pigment with one another or causing them to act on one another at any desired point in time during the operation of preparing them.

For example, the dry components in granule or powder form can be mixed before or after any grinding; one component can be added to the other component in moist or dry form, as for example by mixing the components in the form of the moist presscakes.

Mixing can be accomplished by acid pasting, acid swelling, by grinding in dry form, in moist form, by kneading for example, or in suspension, or by a combination of these methods. Grinding may be carried out with the addition of water, solvents, acids or grinding assistants such as salt.

Mixing can also be accomplished by adding the pigment dispersant to the copper phthalocyanine pigment during the operation of preparing the copper phthalocyanine pigment.

The pigment dispersant is added to the phthalocyanine preferably after the phthalocyanine ring system has been formed, chemically, from the corresponding phthalic acid derivatives.

The crude phthalocyanine pigment obtained commonly in coarsely crystalline form from the chemical synthesis is comminuted, by means of acid pasting, acid swelling or dry or wet grinding, for example. The finely crystalline phthalocyanines formed in the course of comminution can be subjected usually to an aftertreatment, generally referred to as a finish, in water and/or solvents, for example, and generally at elevated temperature, after 200° C. for example, and, if desired, elevated pressure. The pigment dispersant can of course also be added in portions at different times.

The drying of a moist pigment preparation may be carried out using the known drying assemblies, such as drying ovens, bucket-wheel dryers, tumble dryers, contact dryers, and, in particular, spin flash dryers and spray dryers. Through the choice of an appropriate drying assembly it is also possible to produce low-dusting and free-flowing powders or granules.

With preference the pigment preparations are prepared by grinding the components in dry form, in moist form or in suspension, in particular by salt kneading of the components; a further preferred preparation process involves adding the pigment dispersant to the copper phthalocyanine pigment during or after a finish. A third preferred preparation variant is that of mixing in dry form prior to pulverization.

The pigment preparations of the invention can be employed for pigmenting high molecular mass organic materials of natural or synthetic origin, such as plastics, resins, varnishes, paints, electrophotographic toners and developers, electret materials, color filters, inks, including printing inks, and seed, for example.

High molecular mass organic materials which can be pigmented with the pigment preparations of the invention are, for example, cellulose compounds, such as, for example, cellulose ethers and cellulose esters, such as ethylcellulose, nitrocellulose, cellulose acetates or cellulose butyrates, natural binders, such as, for example, fatty acids, fatty oils, resins and their conversion products or synthetic resins, such as, for example, polycondensates, polyadducts, addition polymers and copolymers, such as, for example, amino resins, especially urea and melamine formaldehyde resins, alkyd resins, acrylic resins, phenoplasts and phenolic resins, such as novolaks or resols, urea resins, polyvinyls, such as polyvinyl alcohols, polyvinyl acetals, polyvinyl acetates or polyvinyl ether, polycarbonates, polyolefins, such as polystyrene, polyvinyl chloride, polyethylene or polypropylene, poly(meth)acrylates and copolymers thereof, such as polyacrylic esters or polyacrylonitriles, polyamides, polyesters, polyurethanes, coumarone-indene and hydrocarbon resins, epoxy resins, unsaturated synthetic resins (polyesters, acrylates) with the different cure mechanisms, waxes, aldehyde and ketone resins, gum, rubber and its derivatives and lattices, casein, silicones and silicone resins; individually or in mixtures.

It is unimportant whether the aforementioned high molecular mass organic compounds are present in the form of plastic masses or melts or in the form of spinning solutions, dispersions, varnishes, paints or printing inks. Depending on the intended use it proves advantageous to utilize the pigment preparations of the invention in the form of a blend or in the form of prepared products or dispersions.

It is also possible only to prepare the pigment preparation at the time of incorporation into the high molecular mass organic medium.

The present invention consequently further provides a high molecular mass organic material comprising a coloringly effective amount of a pigment preparation of the invention.

Based on the high molecular mass organic material it is intended to pigment, the pigment preparation of the invention is employed usually in an amount of 0.01% to 30% by weight, preferably 0.1% to 15% by weight.

In certain cases it is also possible, instead of a ground and/or finished pigment preparation of the invention, to employ a corresponding crude having a BET surface area of greater than 2 $m^2/g$, preferably greater than 5 $m^2/g$. This crude can be used to produce color concentrates in liquid or solid form in concentrations of 5% to 99% by weight, alone or, where appropriate, in a mixture with other crudes or ready-produced pigments.

The pigment preparations of the invention are also suitable for use as colorants in electrophotographic toners and developers, such as, for example, one- or two-component powder toners (also called one- or two-component developers), magnetic toners, liquid toners, polymerization toners, and specialty toners. Typical toner binders are addition-polymerization resins, polyaddition resins and polycondensation resins, such as styrene, styrene-acrylate, styrene-butadiene, acrylate, polyester, phenolic-epoxy resins, polysulfones, polyurethanes, individually or in combination, and also polyethylene and polypropylene, which may also include further ingredients, such as charge control agents, waxes or flow assistants, or may be modified subsequently with these added ingredients.

The pigment preparations of the invention are additionally suitable for use as colorants in powders and powder coating materials, particularly in triboelectrically or electrokinetically sprayable powder coating materials which are employed to coat the surfaces of articles made, for example, from metal, wood, plastic, glass, ceramic, concrete, textile material, paper or rubber.

As powder coating resins use is made typically of epoxy resins, carboxyl- and hydroxyl-containing polyester resins, polyurethane resins, and acrylic resins, together with customary hardeners. Combinations of resins are also employed. For example, epoxy resins are frequently used in combination with carboxyl- and hydroxyl-containing polyester resins. Typical hardener components (depending on the resin system) are, for example, acid anhydrides, imidazoles, and also dicyandiamide and the derivatives thereof, masked isocyanates, bisacylurethanes, phenolic resins and melamine resins, triglycidyl isocyanurates, oxazolines, and dicarboxylic acids.

Moreover the pigment preparations of the invention are suitable for use as colorants in ink-jet inks on both an aqueous and a nonaqueous basis, and also in inks which operate in accordance with the hot-melt process.

Ink-jet inks generally contain a total of 0.5% to 15% by weight, preferably 1.5% to 8% by weight (reckoned on a dry basis), of one or more of the pigment preparations of the invention.

Microemulsions are based on organic solvents, water, and, where appropriate, an additional hydrotropic substance (interface mediator). Microemulsion inks contain generally 0.5% to 15% by weight, preferably 1.5% to 8% by weight, of one or more of the pigment preparations of the invention, 5% to 99% by weight of water, and 0.5% to 94.5% by weight of organic solvent and/or hydrotropic compound. "Solvent based" ink-jet inks contain preferably 0.5% to 15% by weight of one or more of the pigment preparations of the invention, 85% to 99.5% by weight of organic solvent and/or hydrotropic compounds.

Hot-melt inks are based usually on waxes, fatty acids, fatty alcohols or sulfonamides which are solid at room temperature and liquefy on heating, the preferred melting range being between about 60° C. and about 140° C. Hot-melt ink-jet inks are composed, for example, essentially of 20% to 90% by weight of wax and 1% to 10% by weight of one or more of the pigment preparations of the invention. They may further include 0 to 20% by weight of an additional polymer (as "dye dissolver"), 0 to 5% by weight of dispersing assistant, 0 to 20% by weight of viscosity modifier, 0 to 20% by weight of plasticizer, 0 to 10% by weight of tack additive, 0 to 10% by weight of transparency stabilizer (which prevents, for example, crystallization of the waxes), and 0 to 2% by weight of antioxidant.

Additionally the pigment preparations of the invention are also suitable for use as colorants for color filters, both for additive and for subtractive color generation, such as, for example, in electrooptical systems such as television screens, LCDs (liquid crystal displays), charge-coupled devices, plasma displays or electroluminescent displays, which may in turn be active (twisted nematic) or passive (supertwisted nematic) ferroelectric displays or light-emitting diodes, and also as colorants for electronic inks (or e-inks) or electronic paper (e-paper). In the production of what are known as color filters, both reflective and transparent color filters, pigments are applied in the form of a pastep or as pigmented photoresists in suitable binders (acrylates, acrylic esters, polyimides, polyvinyl alcohols, epoxides, polyesters, melamines, gelatins, caseins) to the respective LCD components (e.g., TFT-LCD—Thin Film Transistor Liquid Crystal Displays or, e.g., (S) TN-LCD—(Super) Twisted Nematic-LCD). Besides high thermal stability, high pigment purity is a prerequisite for a stable paste and/or a pigmented photoresist. Furthermore, the pigmented color filters can also be applied by ink-jet printing processes or other suitable printing processes.

The reddish blue hues of the pigment preparations of the invention are especially suitable for the color filter color set red-green-blue (R.G.B). These three colors are present as separate color points alongside one another, and when backlit produce a full-color image.

Typical colorants for the red color point are pyrrolopyrrole, quinacridone and azo pigments, such as P.R. 254, P.R. 209, P.R. 175 and P.O. 38, for example, individually or mixed. For the green color point, phthalocyanine colorants are typically employed, such as P.G. 36 and P.G. 7, for example.

As and when required, the respective color points may also be admixed with further colors for the purpose of shading. For the red and green hue it is preferred to carry out blending with yellow, as for example with P.Y. 138, 139, 150, 151, 180 and 213.

The pigment preparations of the invention are notable for their outstanding coloristic and rheological properties, particularly high flocculation stability, ready dispersibility, good rheology, high color strength, transparency, and saturation (chroma). In numerous application media they can be dispersed easily and up to high finenesses. Pigment dispersions of this kind exhibit outstanding rheological properties even at high levels of pigmentation of the paint or printing-ink concentrates. Other properties too, such as gloss, fastness to overcoating, solvent fastness, alkali and acid fastness, light and weather fastnesses, and high cleanness of hue, for example, are very good. Moreover it is possible with the pigment preparations of the invention to obtain hues in the reddish blue range, which are in demand for use in color filters. There they ensure high contrast and also satisfy the other requirements imposed in the case of color filter use, such as high temperature stability or steep and narrow absorption bands. They can be produced in high purity and with a low ion content.

In order to assess the properties of the pigments in the paints sector, in water-free, solvent-based varnish systems, a selection was made, from among the multiplicity of known varnishes, of an alkyd-melamine resin varnish based on a medium-oil alkyd resin and on a butanol-etherified melamine resin (AM).

The coloristic properties were determined in accordance with DIN 55986. The millbase rheology after dispersion was evaluated visually on the basis of the following five-point scale:

| 5 | highly fluid |
| 4 | liquid |
| 3 | viscous |
| 2 | slightly set |
| 1 | set |

The viscosity was determined following dilution of the millbase to the final pigment concentration, using the Rossman viscospatula type 301 from Erichsen.

In the examples which follow, parts and percentages are by weight unless indicated otherwise.

EXAMPLE 1

450 parts of sodium chloride, 75 parts of commercial C.I. pigment Blue 15:6, 3.75 parts of pigment dispersant of the formula (I) with n=1, and 110 ml of diethylene glycol are kneaded at 40° C. for 16 hours. The kneaded composition is stirred in 2500 parts of 5% strength aqueous hydrochloric acid at 40° C. for 2 hours, the suspension is filtered with suction, and the presscake is washed free of salt and dried.

This gives 75.8 parts of pigment preparation.

In the AM varnish the pigment preparation exhibits strongly colored and transparent coatings with a reddish blue hue. The millbase rheology is very good and the viscosity of the masstone varnish is low.

COMPARATIVE EXAMPLE A 80 g of a commercial crude C.I. pigment blue 15 are dissolved in 800 g of 97% strength sulfuric acid at room temperature. The solution is poured into a mixture of 2500 g of ice and 1500 g of water. This mixture is heated to 80° C. and stirred at that temperature for 30 minutes. The suspension is filtered with suction and washing is carried out. This gives a water-moist presscake having a solids content of 21.6%. 188 g of the presscake are stirred in 266 g of tert-amyl alcohol, 110 g of water, and 8.2 g of 97% strength sulfuric acid. Following the addition of 4.1 g of a 30% strength aqueous solution of hexadecyltrimethylammonium chloride, the system is heated to 130° C. and stirred at 130° C. for 3 hours. Then the alcohol is removed by steam distillation, the suspension is filtered with suction, and the presscake is washed and dried at 80° C. This gives 35.7 g of copper phthalocyanine pigment in the alpha phase (determined by means of X-ray spectroscopy).

EXAMPLE 2

Comparative example A is carried out with the sole difference that, prior to heating at 130° C., 8.1 g are added of a water-moist presscake of a pigment dispersant of the formula (I) with n=1, with a solids content of 24.5%. This gives 35.8 g of pigment preparation. The copper phthalocyanine in the pigment preparation is in the alpha phase.

EXAMPLE 3

Comparative example A is carried out with the sole difference that, along with the 80 g of crude C.I. pigment blue 15, 2 g of pigment dispersant of the formula (I) with n=1 are dissolved in the sulfuric acid. This gives 37.8 g of pigment preparation. The copper phthalocyanine in the pigment preparation is in the alpha phase.

EXAMPLE 4

Coatings of Example 2 and 3, Comparison with Comparative Example A

In the AM varnish the pigment preparations of examples 2 and 3 exhibit strongly colored and transparent coatings with very good fastness to overcoating (overcoating fastness determined in accordance with DIN 53221). As compared with comparative example A, the coatings are substantially stronger in color and significantly more transparent, the gloss is higher (gloss measurements were carried out on film draw downs at an angle of 20° C. in accordance with DIN 67530), the hue is cleaner, and the viscosity of the masstone varnishes is lower.

EXAMPLE 5

80 g of a commercial crude tri-/tetrachlorophthalocyanine blue are dissolved in 800 g of 97% strength sulfuric acid at room temperature. The solution is poured into a mixture of 2500 g of ice and 1500 g of water. This mixture is heated to 80° C. and stirred at that temperature for 30 minutes. The suspension is filtered with suction and washing is carried out. This gives a water-moist presscake having a solids content of 23.1%.

170.8 g of the presscake are stirred in 262 g of tert-amyl alcohol, 122.8 g of water and 7.9 g of 100% strength NaOH. Following the addition of 4.1 g of a 30% strength aqueous solution of hexadecyltrimethylammonium chloride and 8.1 g of water-moist presscake of a pigment dispersant of the formula (I) with n=1, with a solids content of 24.5%, the system is heated to 130° C. and stirred at 130° C. for 3 hours. Then the alcohol is removed by steam distillation, the suspension is filtered with suction, and the presscake is washed and dried at 80° C. This gives 39.5 g of pigment preparation.

EXAMPLE 6

80 g of a commercial crude tri-/tetrachlorophthalocyanine blue and 2 g of a pigment dispersant of the formula (I) with n=1 are dissolved in 800 g of 97% strength sulfuric acid at room temperature. The solution is poured into a mixture of 2500 g of ice and 1500 g of water. This mixture is heated to 80° C. and stirred at that temperature for 30 minutes. The suspension is filtered with suction and washing is carried out. This gives a water-moist presscake having a solids content of 23.1%.

170.8 g of the presscake are stirred in 262 g of tert-amyl alcohol, 122.8 g of water and 7.9 g of 100% strength NaOH. Following the addition of 4.1 g of a 30% strength aqueous solution of hexadecyltrimethylammonium chloride the system is heated to 130° C. and stirred at 130° C. for 3 hours. Then the alcohol is removed by steam distillation, the suspension is filtered with suction, and the presscake is washed and dried at 80° C. This gives 37.4 g of pigment preparation.

EXAMPLE 7

Coatings of Example 5 and 6

In a high-solids acrylic resin baking varnish based on a nonaqueous dispersion (HS) the pigment preparations of examples 5 and 6 exhibit transparent masstone coatings; the gloss is high. The metallic coatings are deeply colored and bright and exhibit an angular dependency of hue (color flop). The viscosity of the masstone varnishes is low.

EXAMPLE 8

30 g of a commercial C.I. pigment blue 15:1 were mixed mechanically with 1.5 g of a pigment dispersant of the formula (I) with n=1.

In the AM varnish strongly colored and transparent coatings with a high gloss are obtained; the viscosity of the masstone varnish is low.

In a polyester varnish (PE) based on cellulose acetobutyrate and on a melamine resin, and in the HS varnish, the pigment preparation likewise exhibits transparent and strongly colored coatings. The metallic coatings are deeply colored and bright.

The viscosity of the masstone varnishes is low. The gloss in the HS varnish is high.

In an aqueous polyurethane-based varnish (PUR) as well, strongly colored, transparent coatings are obtained, with deeply colored and bright metallic coatings.

In order to assess the properties of the pigment preparation in the printing-inks field, a selection was made, from among the multiplicity of known printing systems, of a nitrocellulose-alcohol gravure system (NC-A), of an aqueous, acrylic resin-based flexographic system (FD), and of an alkyd resin-based offset system (OD).

With the pigment preparation, strongly colored and transparent prints are obtained in the NC-A, in the FD, and in the OD printing system, and the viscosity of the printing inks is low.

EXAMPLE 9

30 g of a commercial C.I. pigment blue 15:6 were mixed mechanically with 3 g of pigment dispersant of the formula (I) with n=1.

EXAMPLE 10

30 g of a commercial C.I. pigment blue 15:6 were mixed mechanically with 1.5 g of pigment dispersant of the formula (I) with n=1.

EXAMPLE 11

30 g of a commercial C.I. pigment blue 15:6 were mixed mechanically with 0.75 g of pigment dispersant of the formula (I) with n=1.

EXAMPLE 12

Coatings of Example 9, 10 and 11

In the HS and PUR varnishes, strongly colored and transparent coatings are obtained; the metallic coatings are deeply colored and bright; the viscosity of the HS masstone varnishes is low; the gloss of the HS coatings is high.

EXAMPLE 13

Prints of Example 10

With the pigment preparation from example 10, strongly colored and transparent prints with a clean hue are obtained in the NC-A, in the FD and in the OD printing system; the viscosity of the printing inks is low. In the OD printing system good scorch behavior is observed.

EXAMPLE 14

30 g of a commercial C.I. pigment blue 15:3 were mixed mechanically with 1.5 g of pigment dispersant of the formula (I) with n=1.

With the pigment preparation, strongly colored and transparent prints with a clean hue are obtained in the NC-A, in the FD and in the OD printing system; the viscosity of the printing inks is low. In the OD printing system good scorch behavior is observed.

The invention claimed is:

1. A pigment preparation comprising at least one copper phthalocyanine pigment selected from the group consisting of C.I. Pigment Blue 15, 15:0, 15:1, 15:2, 15:3, 15:4, and 15:6, and at least one pigment dispersant of the formula (I),

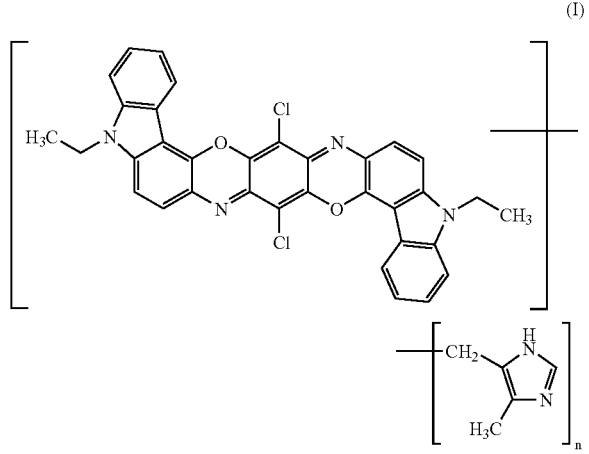

in which n is a number 1, 2, 3 or 4.

2. The pigment preparation as claimed in claim 1, wherein the weight ratio of the at least one copper phthalocyanine pigment to at least one pigment dispersant of the formula (I) is between 99.9 to 0.1 and 75% 25.

3. The pigment preparation as claimed in claim 1, wherein the weight ratio of the at least one copper phthalocyanine pigment to the at least one pigment dispersant of the formula (I) is between 99 to 1 and 80 to 20.

4. The pigment preparation as claimed in claim 1, wherein the weight ratio of the at least one copper phthalocyanine pigment to the at least one pigment dispersant of the formula (I) is between 97 to 2.5 and 90 to 10.

5. The pigment preparation as claimed in claim 1, wherein n is a number 1, 2 or 3.

6. The pigment preparation as claimed in one or more at claim 1, wherein n is a number 1 or 2.

7. The pigment preparation as claimed in claim 1, further comprising at least one compound selected from the group consisting of surfactants, nonpigmentary dispersants, pigmentary dispersants, fillers, standardizers, resins, waxes, defoamers, anti dust agents, extenders, antistatics, shading colorants, preservatives, drying retardants, rheology control additives, wetting agents, antioxidants, UV absorbers, and light stabilizers.

8. A process for preparing a pigment preparation as claimed in claim 1, comprising the step of mixing the at least one copper phthalocyanine pigment and the at least one pigment dispersant of the formula (I) and, optionally, one or more auxiliaries, one or more additives or both.

9. A pigmented high molecular mass organic material of natural or synthetic origin pigmented by the pigment preparation as claimed in claim 1, wherein the high molecular mass organic material of natural or synthetic origin is selected from the group consisting of plastics, resins, varnishes, paints, electrophotographic toners, electrophotographic developers, electret materials, color filters, inks, printing inks, and seed.

10. A high molecular mass organic material comprising a coloringly effective amount of a pigment preparation as claimed in claim 1.

* * * * *